United States Patent
Schumacher et al.

(10) Patent No.: US 7,313,903 B2
(45) Date of Patent: Jan. 1, 2008

(54) CUTTER BAR

(75) Inventors: Gustav Schumacher, Gartenstrasse 8, Eichelhardt (DE) 57612; Friedrich-Wilhelm Schumacher, Eichelhardt (DE)

(73) Assignee: Gustav Schumacher (DE)

( * ) Notice: Subject to any disclaimer, the term of this patent is extended or adjusted under 35 U.S.C. 154(b) by 355 days.

(21) Appl. No.: 10/528,280

(22) PCT Filed: Oct. 7, 2003

(86) PCT No.: PCT/EP03/11046

§ 371 (c)(1),
(2), (4) Date: Mar. 17, 2005

(87) PCT Pub. No.: WO2004/032602

PCT Pub. Date: Apr. 22, 2004

(65) Prior Publication Data

US 2006/0150607 A1     Jul. 13, 2006

(30) Foreign Application Priority Data

Oct. 8, 2002   (DE) ............................... 102 46 867

(51) Int. Cl.
*A01D 34/40* (2006.01)
(52) U.S. Cl. ..................................................... 56/304
(58) Field of Classification Search ............... 56/296, 56/291, 305, 123, 298, 257, 304
See application file for complete search history.

(56) References Cited

U.S. PATENT DOCUMENTS

| | | | |
|---|---|---|---|
| 1,583,454 A | | 5/1926 | Goodwin |
| 1,642,808 A | * | 9/1927 | Goodwin ..................... 56/305 |
| 1,644,962 A | * | 10/1927 | Swickard ..................... 56/297 |
| 1,856,488 A | * | 5/1932 | Livesay ....................... 56/298 |
| 2,790,295 A | * | 4/1957 | Collins ........................ 56/296 |
| 4,910,946 A | * | 3/1990 | Underwood ................ 56/14.4 |
| 6,062,012 A | * | 5/2000 | Suarez et al. ................ 56/257 |
| 6,889,492 B1 | * | 5/2005 | Polk et al. ................... 56/257 |
| 2002/0035827 A1 | * | 3/2002 | Yang et al. ................... 56/298 |

* cited by examiner

Primary Examiner—Árpád Fábián Kovács
(74) Attorney, Agent, or Firm—Harness, Dickey & Pierce, P.L.C.

(57) ABSTRACT

The invention relates to a reciprocating cutting bar for the cutting gear of an agricultural machine, comprising a longitudinal axis (4) along which the reciprocating cutting bar may be moved in a working direction for crop cutting, a finger bar (1), cutting fingers (2), which are fixed to the finger bar (1), each forming counter cutters (11), a knife (5) with a knife bar (7), having knife blades (8) fixed to the knife bar (7) which each have cutters (9), whereby the knife (5) is made to oscillate relative to the finger bar (1) along a transverse axis (6), which is arranged horizontally and perpendicular to the longitudinal axis (4), rollers (13), by means of which the knife (5) is supported against the finger bar (1) to the rear when viewed in the working direction. The rollers (13) are each mounted to rotate on a roller holder (17) and the roller holders (17) are fixed to the finger bar (1).

9 Claims, 4 Drawing Sheets

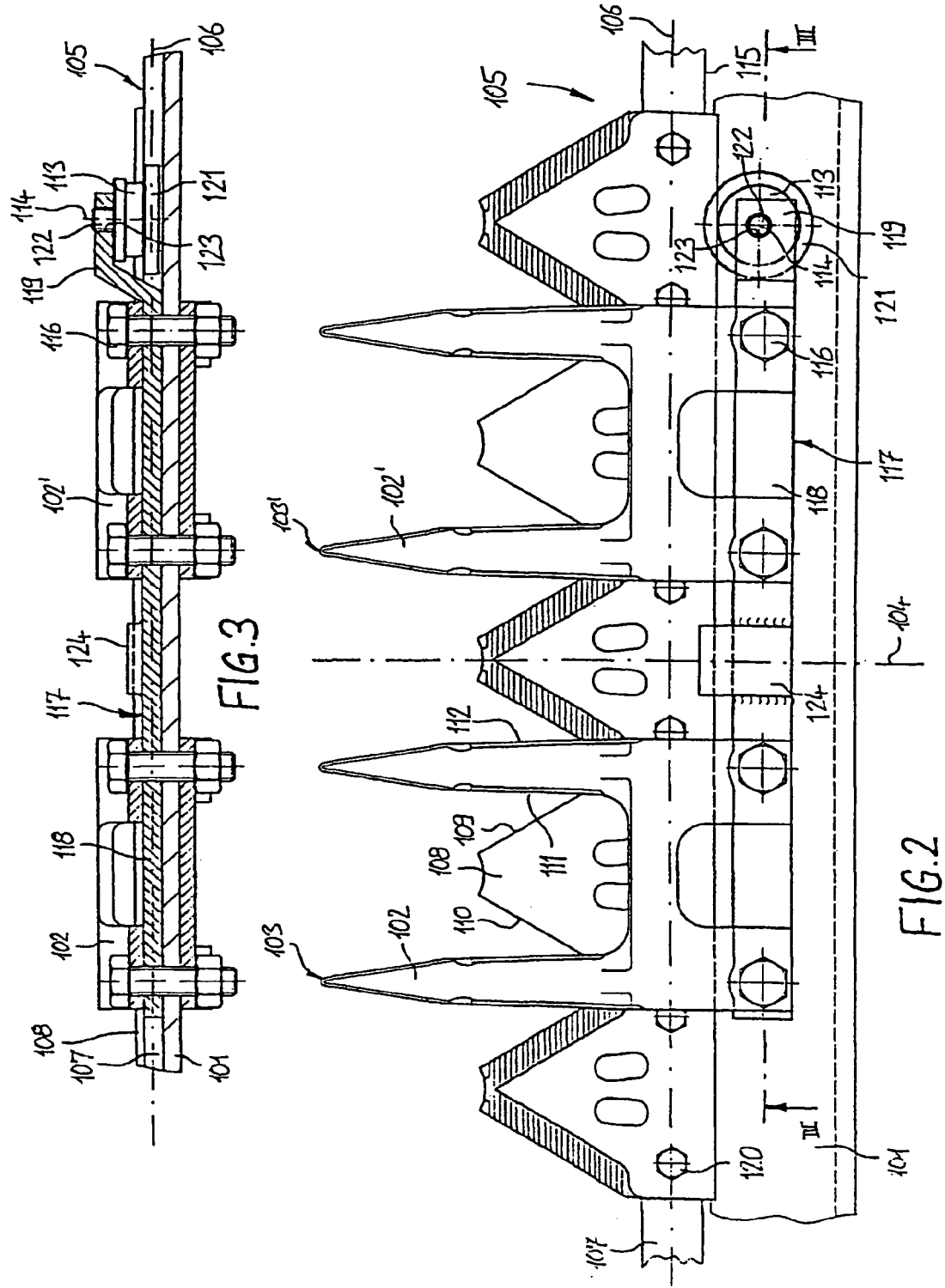

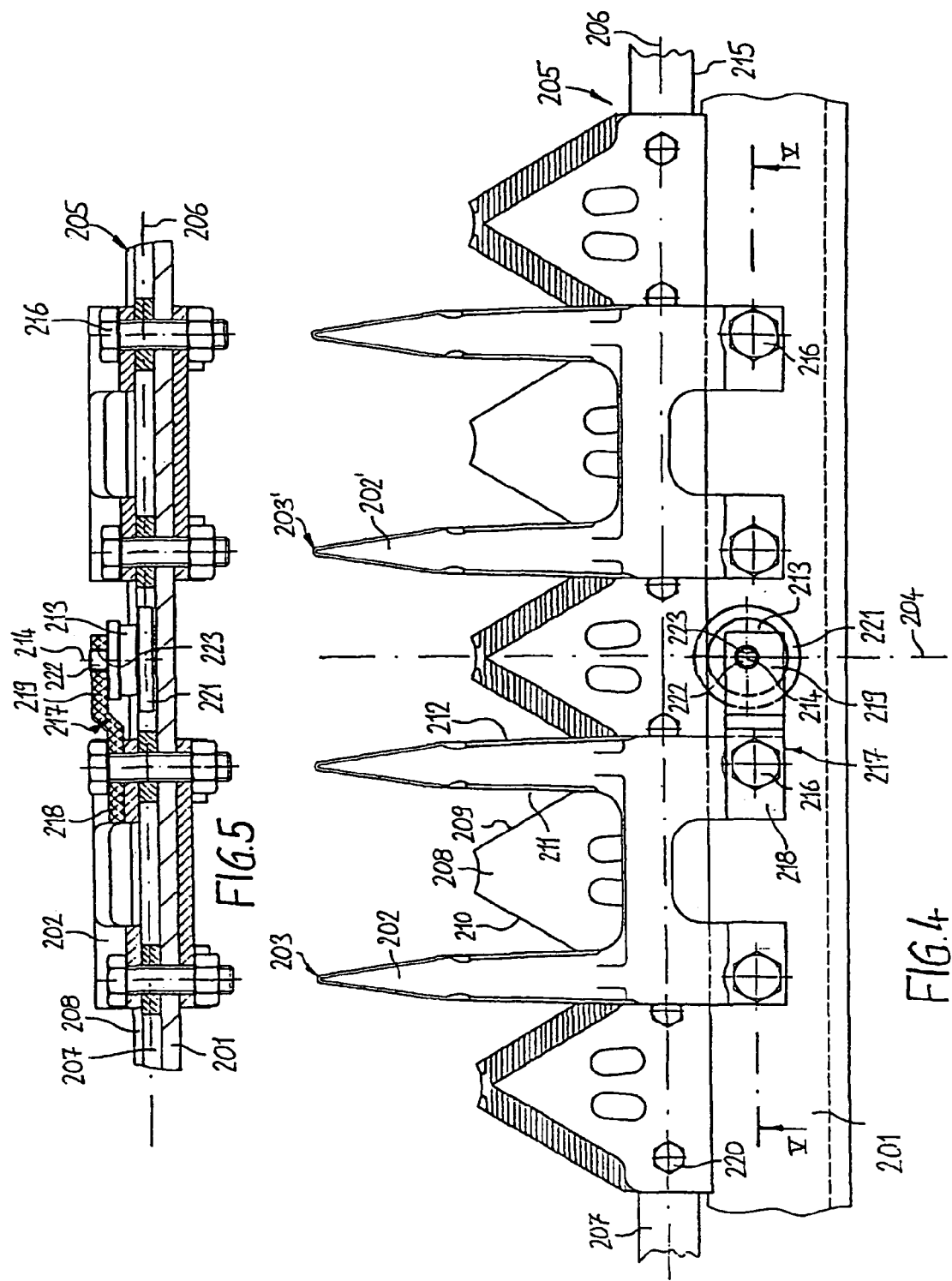

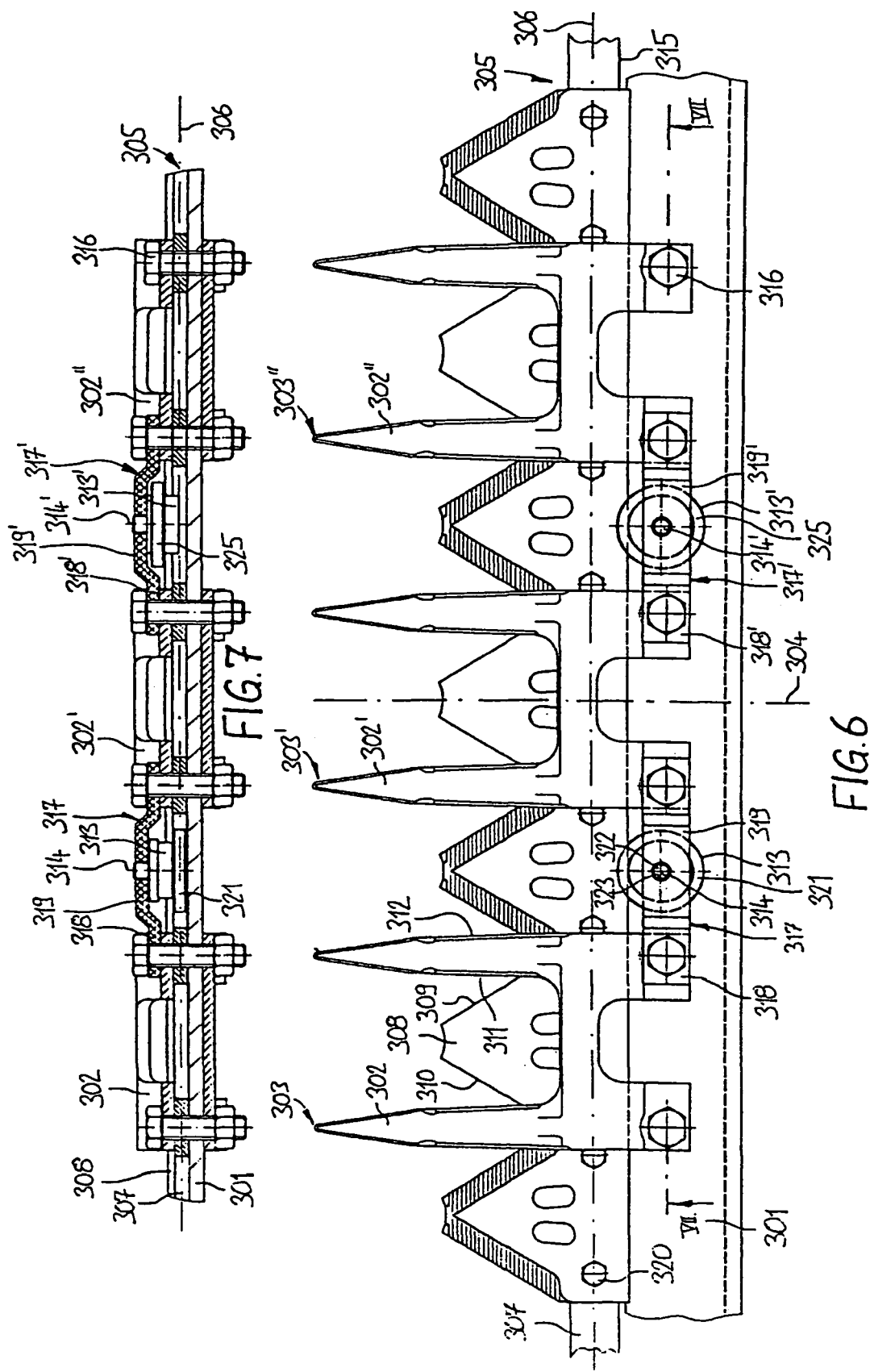

CUTTER BAR

CROSS-REFERENCE TO RELATED APPLICATIONS

This application claims priority to German Patent Application No. 10246867.2, filed Oct. 8, 2002, which application is herein expressly incorporated by reference.

FIELD OF THE INVENTION

The invention relates to a cutter bar of a cutting device of an agricultural implement.

BACKGROUND OF THE INVENTION

Cutter bars include a finger bar which has a plurality of reaping fingers. A knife reciprocates relative to the finger bar. The knife includes a knife bar which has several blades. The blades form cutting edges. Counter cutting edges are formed by the reaping fingers and interact with the blades.

The blades have a generally triangular base. During the cutting procedure, the harvesting goods, due to the reciprocating movement of the knife, are pressed by the blades against the reaping fingers and cut. Accordingly, a scissor-like cutting movement is produced. Thus, each individual blade is pushed to the back, when viewed in a working direction, by the cutting load. Thus, a knife supporting guide, relative to the finger bar, is necessary to hold the knife in its position relative to the finger bar. Such a guide is shown in DE 198 50 261 A1. Here, the cutter bar has a guide plate mounted on the finger bar. The guide plate forms a guide face extending in the direction of the movement direction of the knife and is facing the knife. The knife is supported, when viewed in a working direction, to the rear by the knife bar on the guide face of the guide plate. While the knife bar reciprocates, the guide plate is rigidly mounted on the finger bar. The knife is pressed independent of the cutting force more or less strongly against the guide plate. The cutting force can increase due to the harvesting good, which is difficult to cut, or due to dull knife blades. Thus, increased frictional forces are active between the knife bar and the guide plate. This leads, especially with sandy and corundum-containing soil, to a larger wear on the knife bar and on the guide plate. Furthermore, besides the driving power necessary for cutting the harvesting goods, a significant part of the driving power is necessary for the reciprocating movement of the knife. The necessary driving power to move the knife is often higher than the necessary driving power for the cutting process.

In CH 148 390 the frictional force is reduced by a roller guide. The guide plates have recesses on which the cutter bar rollers are rotational mounted. The knife is supported, when viewed in the working direction, to the rear on the rollers and is guided by the guide plates. However, friction is still produced between the knife and the guide plates.

SUMMARY OF THE INVENTION

It is the object of the present invention to provide a cutter bar which has a long life. The present invention enables an adaptation of the support for the knife.

The present invention has a cutter bar of a cutting device of an agricultural device which defines a longitudinal axis, along which the cutter bar is movable to cut harvesting goods in a working direction. The invention has a finger bar and reaping fingers attached on the finger bar which form, respectively, counter cutting edges. A knife has a knife bar with blades, attached on the knife bar. The blades have cutting edges. The knife is reciprocatingly guided along an axis transverse relative to the finger bar. The transverse axis is transversally and horizontally arranged to the longitudinal axis. Rollers support the knife on the finger bar to the rear, when viewed in the working direction. The rollers are, respectively, rotationally supported on a roller holder. The roller holders are mounted on the finger bar.

Accordingly, no frictional resistance between the knife and the finger bar has to be overcome. Only the rolling resistance of the rollers has to be overcome, which is distinctly lower. Thus, distinctly lower driving forces are necessary to drive the knife. Thus, smaller dimensioned drives can be used.

Due to the use of a roller holder, no specific fixing bores need to be provided to attach the rollers. Rather, the roller holder can be adapted to different cutter bars from different manufacturers. Furthermore, it is possible to retrofit existing cutter bars. A further advantage is that it is possible to adjust the roller holder in its position with respect to the finger bar.

Advantageously, the knife bar is supported on the rollers. Accordingly, no additional components are necessary, which have to be mounted on the blade of the knife bar, to ensure support. The knife can be vertically supported on the rollers to prevent tipping of the knife with respect to the finger bar. For this, the blades can project in the direction to the finger bar beyond the knife bar and can be vertically supported on the rollers. Thus, no further components are necessary for vertical support.

Alternatively, at least one roller includes, on its circumferential face, a circumferentially extending first collar. The knife is supported vertically downwards by the extending first collar.

Additionally, at least one roller includes, on its circumferential face, a circumferentially extending second collar. The knife is supported vertically upwards by the extending second collar.

Accordingly, the knife is vertically supported. For better self-cleaning of penetrated soil material, neighbouring rollers can, alternatively, be provided, respectively, with one first collar or one second collar. Here, one roller has only one first collar, wherein the next neighbouring roller has only one second collar.

The rollers can be rotationally supported on the finger bar around a vertically arranged rotational axis. Accordingly, the rollers can have a bearing bore which extends coaxially to the rotational axis. Thus, the rollers are rotationally supported on an outer face of a bearing shaft and form a sliding-type bearing. This represents an extremely low cost and robust bearing arrangement. The rollers and the bearing shafts can be manufactured from a hard-sintered material. Also, rolling member bearings can be provided between the rollers and the corresponding bearing shafts.

The radial bearing clearance of the sliding bearing should be dimensioned relatively large so that entering dirt and moisture can be removed from the sliding bearing. Accordingly, to enable this removal, at least one first longitudinal groove is provided in the bearing bore of the roller. Further, at least one second longitudinal groove is formed in the outer face of the bearing shaft to enable self-cleaning. Thus, due to the rotation of the rollers relative to the bearing shaft, dirt is removed from the upper faces and is transported out of the sliding bearing.

The bearing shafts can be provided sleeve-like with a central attachment bore. Fixing screws are passed through the attachment bores to directly attach of the bearing shaft on the finger bar. Separate screws can act as the fixing screws. The separate screws rest in separate bores of the finger bar, as well as those screws, with which the reaping finger is attached on the finger bar. Rollers can be provided, depending on the loading, on each screw or only on some of the screws to attach a reaping finger. Preferably, the reaping fingers and the roller holders are attached by a common fixing screw on the finger bar. In this case, the roller holders can be attached by at least one fixing screw of a reaping finger.

The roller holders can, however, also be arranged between two reaping fingers arranged next to each other. Thus, the roller holders are attached by the fixing screws of the two reaping fingers, arranged next to each other.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a top plan view of a second embodiment of a cutter bar;

FIG. 3 is a longitudinal sectional view of the cutter bar of FIG. 2 along line III-III thereof;

FIG. 4 is a top plan view of a third embodiment of a cutter bar;

FIG. 5 is a longitudinal sectional view of the cutter bar of FIG. 4 along line V-V thereof;

FIG. 6 is a top plan view of a fourth embodiment of a cutter bar; and

FIG. 7 is a longitudinal sectional view of the cutter bar of FIG. 6 along line VII-VII thereof.

DETAILED DESCRIPTION OF THE PREFERRED EMBODIMENTS

Figure 1:
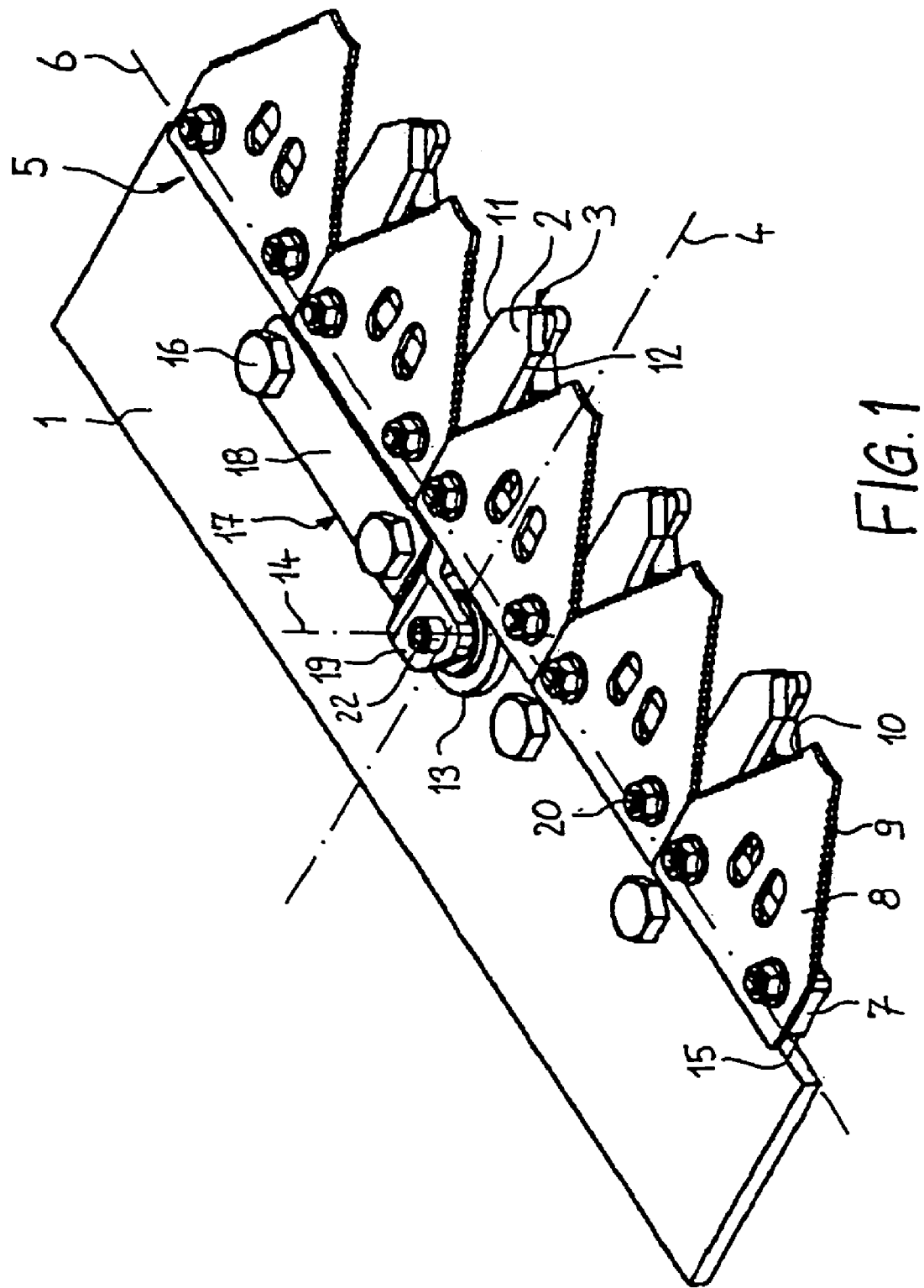
FIG. 1 is a perspective view of a first embodiment of a cutter bar with a roller attached on a roller holder.

The following description of the preferred embodiment(s) is merely exemplary in nature and is in no way intended to limit the invention, its application, or uses.

FIG. 1 illustrates a first embodiment of a cutter bar according to the invention. The cutter bar has a finger bar 1, attached on an agricultural implement. Reaping fingers 2 are arranged on the cutter bar 1. The free ends 3 of the reaping fingers 2 point in the working direction of the agricultural implement and are arranged parallel to a longitudinal axis 4. A knife 5 is reciprocatingly movably guided along a transverse axis 6 relative to the finger bar 1. The transverse axis 6 extends at a right angle to the longitudinal axis 4. The knife 5 includes a knife bar 7 as well as several blades 8. The blades 8 are supported on each other in the direction of the transverse axis 6. The blades 8 form, respectively, a first cutting edge 9 and a second cutting edge 10. The first cutting edges 9 interact, respectively, with at least one first counter cutting edge 11 of a reaping finger 2. The second cutting edges 10 also interact, respectively, with at least one second counter cutting edge 12 of the reaping finger 2. The first cutting edges 9 and the first counter cutting edges 11 as well as the second cutting edges 10 and the second counter cutting edges 12 are, respectively, arranged at an angle to each other. The cutting and counter cutting edges form an angle, which, when viewed in the working direction, opens to the front. Therefore, during the reciprocating movement of the knife 5, a cutting movement is achieved comparable to scissors. Thus, cutting forces are produced in the direction of the longitudinal axis 4 against the working direction.

Rollers 13 are provided to support the cutting forces. The rollers 13 are, respectively, rotationally supported around a vertically arranged rotational axis 14. The rotational axis 14 is arranged perpendicularly to a plane formed by the longitudinal axis 4 and the transversal axis 6. The knife bar 7 is supported at its rear on the roller 13 by a support face 15. Thus, during the reciprocating movement of the knife 5, the rollers 13 are reciprocatingly rotated around the rotational axis 14. Accordingly, only a rolling resistance has to be exceeded and not any frictional forces.

A roller holder 17 is mounted with an attachment portion 18 on the finger bar 1. The fixing screws 16 attach the reaping finger 2 on the finger bar 1. The rollers 13 are rotationally supported on a bearing portion 19 of the roller holder 17.

The reaping fingers 2 are arranged vertically below the finger bar 1. Bores are provided in the finger bar 1. The bores are aligned with a bore in one of the reaping fingers 2 and a bore of the roller holder 17. A fixing screw 16 is passed through these bores. Two reaping fingers 2 can be manufactured from one component due to stability reasons. Thus, the reaping fingers 2 form a U-shaped double finger.

The blades 8 are attached, via screws 20, on the knife bar 7. The blades 8 are arranged vertically above the knife bar 7. The blades 8 project in a direction towards the finger bar 1 to the rear beyond the knife bar 7. The blades 8 are supported vertically downwards on the rollers 13. According to this embodiment, no further components are necessary to support the knife 5 on the rollers 13.

FIGS. 2 and 3 show a second embodiment of a cutter bar according to the invention. Components, which correspond to components of the first embodiment, are provided with reference numerals which are increased by the numerical value 100.

Like the knife of the first embodiment, the blades 108 project in a direction toward the finger bar 101 to the rear beyond the knife bar 107. The blades 108 are supported vertically downwards on the roller 113. The roller 113 has a first collar 121 which vertically downwardly abuts the blades 108.

In contrast to the first embodiment, the reaping fingers 102, 102' are mounted vertically on the top of the finger bar 101. The roller holder is arranged between the reaping fingers 102, 102' and the finger bar 101. The roller holder is fixed by the fixing screws of two neighbouring reaping fingers 102, 102'. The roller 113 is rotationally mounted by a screw 122 in a threaded bore 123 of the bearing portion 119 of the roller holder 117.

FIGS. 4 and 5 show a third embodiment. Components, which correspond to components of the first embodiment, are provided with reference numerals, which are increased by the numerical value 200.

Unlike the second embodiment, the roller holder 217 is formed shorter and is attached by a fixing screw 216 to one of the reaping fingers 202 on the top of the reaping finger 202.

A fourth embodiment is illustrated in FIGS. 6 and 7. Components, which correspond to components of the first embodiment, are provided with reference numerals, which are increased by the numerical value 300.

In the fourth embodiment, the roller holders 317 are in the form of bridges. The roller holders 317 are arranged between neighbouring reaping fingers 302, 302', 302". The roller holders 317 are fixed by fixing screws 316 of the neighbouring reaping fingers 302, 302', 302".

Furthermore, one of the rollers has a first collar 321. The blades 308 are supported vertically downwards against the first collar 321. A roller 313', arranged next to the roller 313, has a second collar 325. The blades 308 are vertically supported upwards against the second collar 325. Thus, this ensures an improved guide of the knife 305.

Alternatively, all rollers can have, respectively, a first collar and a second collar. Thus, the blades are supported vertically downwards as well as vertically upwards on each roller. Further, the reaping fingers can be arranged vertically below the finger bar. Also, the roller holders can be arranged vertically below the reaping finger.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A cutter bar of a cutting device of an agricultural machine comprising:
   a longitudinal axis along which the cutter bar is movable for cutting harvesting goods in a working direction;
   a finger bar;
   reaping fingers attached on the finger bar, said reaping fingers forming counter cutting edges;
   a knife having a knife bar and blades attached on the knife bar, said blades having cutting edges, said knife is reciprocatingly guided along a transverse axis relative to the finger bar, said transverse axis is transversally and horizontally arranged to the longitudinal axis;
   rollers supporting said knife at its rear on the finger bar, the knife bar is supported on the rollers when viewed in the working direction, said rollers are, respectively, rotationally supported on a roller holder, said roller holders are mounted on the finger bar such that the roller holder is formed as a bridge between two neighboring reaping fingers.

2. The cutter bar according to claim 1, wherein the knife is supported vertically downwards on the rollers.

3. The cutter bar according to claim 2, wherein the blades project in the direction to the finger bar beyond the knife bar and are supported vertically on the rollers.

4. The cutter bar according to claim 2, wherein at least one roller has, on its circumferential face, a circumferentially extending first collar, said knife is supported vertically downwards on said first collar.

5. The cutter bar according to claim 4, wherein at least one roller has, on its circumferential face, a circumferentially extending second collar, said knife is supported vertically upwards on said second collar.

6. The cutter bar according to claim 1, wherein the reaping fingers and the roller holders are attached by a common fixing screw on the finger bar.

7. The cutter bar according to claim 6, wherein the roller holders are, respectively, attached by at least one fixing screw of a reaping finger.

8. The cutter bar according to claim 6, wherein the roller holders are, respectively, arranged between two reaping fingers arranged next to each other, said roller holders are attached by fixing screws of both reaping fingers arranged next to each other.

9. The cutter bar according to claim 2, wherein at least one roller has, on its circumferentially face, a circumferentially extending collar, said knife is supported vertically upwards on said collar.

* * * * *